United States Patent [19]

Emoto

[11] Patent Number: 5,249,835
[45] Date of Patent: Oct. 5, 1993

[54] SUN VISOR ACCESSORY

[76] Inventor: Clesson T. Emoto, 812 Kealahou St., Honolulu, Hi. 96825

[21] Appl. No.: 930,086

[22] Filed: Aug. 13, 1992

[51] Int. Cl.⁵ .............................................. B60J 3/02
[52] U.S. Cl. .................................... 296/97.6; 296/97.8
[58] Field of Search ........................... 296/97.6, 97.8; 160/DIG. 3

[56] References Cited

U.S. PATENT DOCUMENTS

| | | | |
|---|---|---|---|
| 2,820,669 | 1/1958 | Lowe | 296/97.8 |
| 2,829,919 | 4/1958 | Bartlett | 296/97.6 |
| 3,351,375 | 11/1967 | Wheeler | 296/97.6 |
| 3,371,955 | 3/1968 | Herrington, Sr. | 296/97.8 |
| 3,722,949 | 3/1973 | Palman | 296/97.6 |
| 4,023,854 | 5/1977 | Nack, Jr. | 296/97.6 |
| 4,352,519 | 10/1982 | Aro | 296/97.8 |
| 4,848,822 | 7/1989 | Da Costa | 296/97.8 |
| 4,889,380 | 12/1989 | Pillifant, Jr. | 296/97.6 |
| 4,913,483 | 4/1990 | Jasso | 296/97.6 |
| 4,919,469 | 4/1990 | Aizawa et al. | 296/97.6 |
| 4,982,992 | 1/1991 | Vu et al. | 296/97.6 |

FOREIGN PATENT DOCUMENTS

2173461 10/1986 United Kingdom .

Primary Examiner—Robert R. Song
Attorney, Agent, or Firm—Martin E. Hsia

[57] ABSTRACT

A sun visor accessory comprising a backing (72) having a substantially flat front surface substantially free of projections suitable for displaying advertising and other matter, a glare shield (76) movably attached to the backing (72) to move between an up and stored position and a down and operational position, and means for attaching the backing to a sun visor so that the front surface remains substantially flat and substantially free of projections. Preferably the backing (72) has a triangular cross section, which provides a second display space on the base of the triangle and the backing (72) is attached to the sun visor by an elongated clamp (74) having a clamp surface that is substantially flat and substantially free of projections. Preferably also, the backing and the clamp are integrally formed from a single sheet of material. The base also can be hingedly attached to the rest of the backing (72) to define a storage space. The glare shield (76) can be stored in the backing (72) and be slidably mounted in the backing (72). Optionally, grooved tracks (54) or magnets (56) can be used for removably retaining signs on the front surface or the base.

25 Claims, 11 Drawing Sheets

SUN VISOR ACCESSORY

DESCRIPTION

1. Technical Field

This invention relates to accessories for sun visors and media for displaying advertisements, trademarks, or other material.

2. Background Art

Sun visors are standard automobile equipment designed to provide a positionable shade against the sun's light glaring into the user's eyes. However, there are conditions when the sun shines beneath the sun visor, thereby impairing the user's vision and impairing driving safety. Glare shields for these conditions are known, but such glare shields must be relatively light in weight because they are normally mounted on the sun visor, which itself is usually pivotally mounted, with only friction retaining it in position. The glare shield is usually pivotable between a down and operational position and an up and stored position, because it is needed only in conditions when the sun is low and the user is facing the sun. If the glare shield is too heavy, then it may cause the sun visor to pivot to its down and operational position. Further, a shock (such as from the vehicle going over a bump) may cause the glare shield or the visor to pivot unexpectedly, which could be a safety hazard.

Another disadvantage of existing glare shields is the loss of storage ability. Many owners of vehicles use the sun visor as a storage place for papers, such as the vehicle's registration, and other small objects, such as pencils, by attaching them to the visor with a rubber band. This storage ability would be lost or impaired if a glare shield is attached to the sun visor.

Many patents have been issued for glare shields to be attached to sun visors.

U.S. Pat. No. 4,982,992 to Vu discloses a tinted transparent guard having two clips and a bracket for attachment to a standard sun visor, the bracket allowing the guard to rotate transversely relative to the sun visor, to slide laterally side to side, or to pivot up and down. This design does not provide frictional pivotal hinges or a means for latching the transparent guard in the up and stored position. Without any one of these features, the transparent guard will be able to abruptly pivot down and startle the driver of the vehicle.

U.S. Pat. No. 2,820,669 to Lowe discloses a dual anti-glare shield arrangement that allows using a shield with ten percent transparency, a shield with twenty seven percent transparency, or both collectively. The shields are pivotally mounted with a complicated coil spring and hinge assembly.

U.S. Pat. No. 4,023,854 to Nack, Jr. discloses a springy U-shaped clamp to attach a tinted transparent glare shield to a sun visor. The clamp assembly is designed so that the transparent glare shield can be stored in a latched position thereby preventing the shield from inadvertently pivoting down to startle the driver.

U.S. Pat. No. 2,829,919 to Bartlett discloses a pair of parallel arms and set screws as a means for attaching and adjusting a tinted transparent glare shield to a sun visor. The device also includes two tinted transparent side wings that increase the tinted viewing area.

U.S. Pat. No. 3,351,375 to Wheeler discloses a glare shield of woven material or fabric. Spring-closed U-shaped clamps are used to secure the device to a sun visor. The embodiment is primarily an extension of the existing sun visor and does not appear to utilize a tinted transparent shield.

U.S. Pat. No. 3,722,949 to Palman discloses a wire mounting frame that inserts into a hinge assembly that is attached to a sun visor by elastic straps. The hinge assembly is grooved to latch the device in the up and stored, or down and operational positions. The wire frame will become distorted if not made durable and rigid, however making it durable and rigid can add to the cost and weight of the design. The wire frame may also pose a distraction to the user.

U.S. Pat. No. 4,352,519 to Aro discloses a plastic backing that attaches to the sun visor via metal clips. The plastic backing has a hinge for attaching a glare shield. The plastic backing also includes a latch to retain the glare shield in the up and stored position. The embodiment utilizes three knuckles to form the hinge.

U.S. Pat. No. 4,848,822 to Da Costa discloses a wave like configuration to enhance fastening the clamp and visor extender to an automobile visor.

U.S. Pat. No. 4,913,483 to Jasso discloses various means of attaching a sun shield to an existing sun visor .+with the purpose of rotating the sun shield horizontally to the window side of the driver and specifically designed to shade against glare coming from the side of the vehicle.

U.S. Pat. No. 4,919,469 to Aizawa discloses a hinge and rotor assembly to pivot or rotate the sun shield in the up and down direction, or rotated horizontally within its plane. The invention utilizes a single elastic strap to secure the product to the sun visor. For the purpose of achieving a rotational motion, a complicated rotor assembly is utilized.

In general, the devices disclosed in the patents described above provide various means for attaching a glare shield to a standard sun visor. However, none of the patents described above provides a means for displaying advertisements, trademarks or other material. Businesses are constantly searching for creative ways to advertise or display their trademarks. One way is to print advertisements or trademarks on products and distribute these products to customers or potential customers free of charge. Owners of vehicles also search for novelty items to personalize their vehicles.

A sun visor has two sides, the side facing the window being referred to as the windshield side and the other side being referred to as the passenger side. If a device is attached to the passenger side of the sun visor, it will not be visible to observers outside the vehicle, and if the device is substantially flat and folded against the passenger side of the sun visor when stored, it will not be visible to passengers when the sun visor is stored.

It is therefore an object of this invention to provide a universal tinted transparent glare shield assembly that can be attached to a standard sun visor found on automobiles or other vehicles.

It is a further object of this invention to provide a premium or novelty product for displaying advertisements, trademarks and other material.

It is a still further object of this invention to provide a device that can store papers and small items such as the automobile registration form, safety inspection

DISCLOSURE OF INVENTION

These and other objects are obtained by an accessory for a sun visor, comprising a backing having a substantially flat front surface substantially free of projections, attachment means for attaching the backing to the windshield side of the sun visor mounted on the backing at a location other than the front surface (so that substantially all of the front surface of the backing remains substantially free of projections) and a glare shield movably mounted on the backing to move between an up and stored position and a down and operational position.

While the glare shield is in the down and operational position, the front surface of the backing will face out through the front windshield of the automobile where it can be utilized as a means for displaying advertisements, trademarks, and other material because it is substantially flat and substantially free of projections.

Preferably the backing has a triangular cross section defined by a front member defining the front surface and having a lower edge, a rear member defining a rear surface and having a lower edge, and a base member having a base surface that is substantially flat and substantially free of projections disposed between the lower edges of the front and rear surfaces. The attachment means preferably comprises an elongated clamp member attached to the rear member having a clamp surface spaced apart from, substantially parallel to and facing in substantially the same direction as the rear surface, that is also substantially flat and substantially free of projections. The clamp member compresses the sun visor between the clamp member and the rear surface when the sun visor is inserted between the rear surface and the clamp member, so that the accessory is attached to the sun visor. Preferably also, the front member, the base member, the rear member and the elongated clamp are integrally formed from a single sheet of material and the glare shield is slidably mounted on the backing. This configuration will allow displaying advertisements, trademarks and other material on the base surface towards the interior of the automobile while the accessory is in the up and stored position, and displaying such material on the clamp surface while the accessory is in the down and operational position.

In an alternative embodiment, a backing having a rectangular cross section can be used.

In another alternative embodiment, the base of the triangular cross section backing can be hingedly attached to one of the other surfaces of the backing so that it can be opened and closed, thus creating a mini storage space inside the backing.

In still another alternative embodiment, the triangular cross section backing can be used as a mini storage space, but without the glare shield assembly.

In another embodiment, the triangular cross section backing can be used as a mini storage space and the glare shield can be stored inside the storage space.

In still another embodiment, grooved tracks or other sign retaining means can be provided on at least one edge of a surface of the backing to function as a way to readily change, add, or remove displays by sliding them in and out through these grooved tracks. Alternatively, signs can be made of a magnetic material and magnets can be used to retain the signs.

Other features and advantages of the invention will become apparent with reference to the accompanying drawings.

BRIEF DESCRIPTION OF DRAWINGS

FIGS. 8A, 8B, and 8C are detail views of the hinge assembly of the embodiments of FIGS. 1 and 3. FIG. 8A shows the end of the short side of the metal or plastic clamp. FIG. 8B shows the position of the visor clip assembly in the up and latched position. FIG. 8C shows the position of the visor clip in the down and latched position.

FIGS. 9A, 9B, and 9C are detail views of the hinge for the embodiment of FIG. 4. FIG. 9A is a top plan view of the hinge for the base. FIG. 9B is a side elevational view of the hinge when the base is in the closed position. FIG. 9C is a side elevational view of the hinge when the base is in the opened position.

BEST MODES FOR CARRYING OUT INVENTION

Referring initially to FIGS. 1, 2, 5, 10, and 11, an accessory 10 according to one embodiment of this invention comprises a backing 12 having a rectangular cross section, a substantially rectangular, tinted, transparent glare shield 42 having rounded edges, two holding brackets 20 and 22 attached at their ends to the backing 12 (defining passageways between the main body of inserts 20 and 22 and the backing 12), two pairs of projecting buttons 24 and 26, two J-shaped band clamps 30 and 32 (configured to pass through the passageways defined by the brackets 20 and 22) having holes 31 and 33 (configured to receive buttons 24 and 26), and two pairs of support mounts 14 and 16 that are used to secure two elastic cords (or straps having hook and loop fasteners, such as Velcro ®) 60 and 62.

Figure 1:
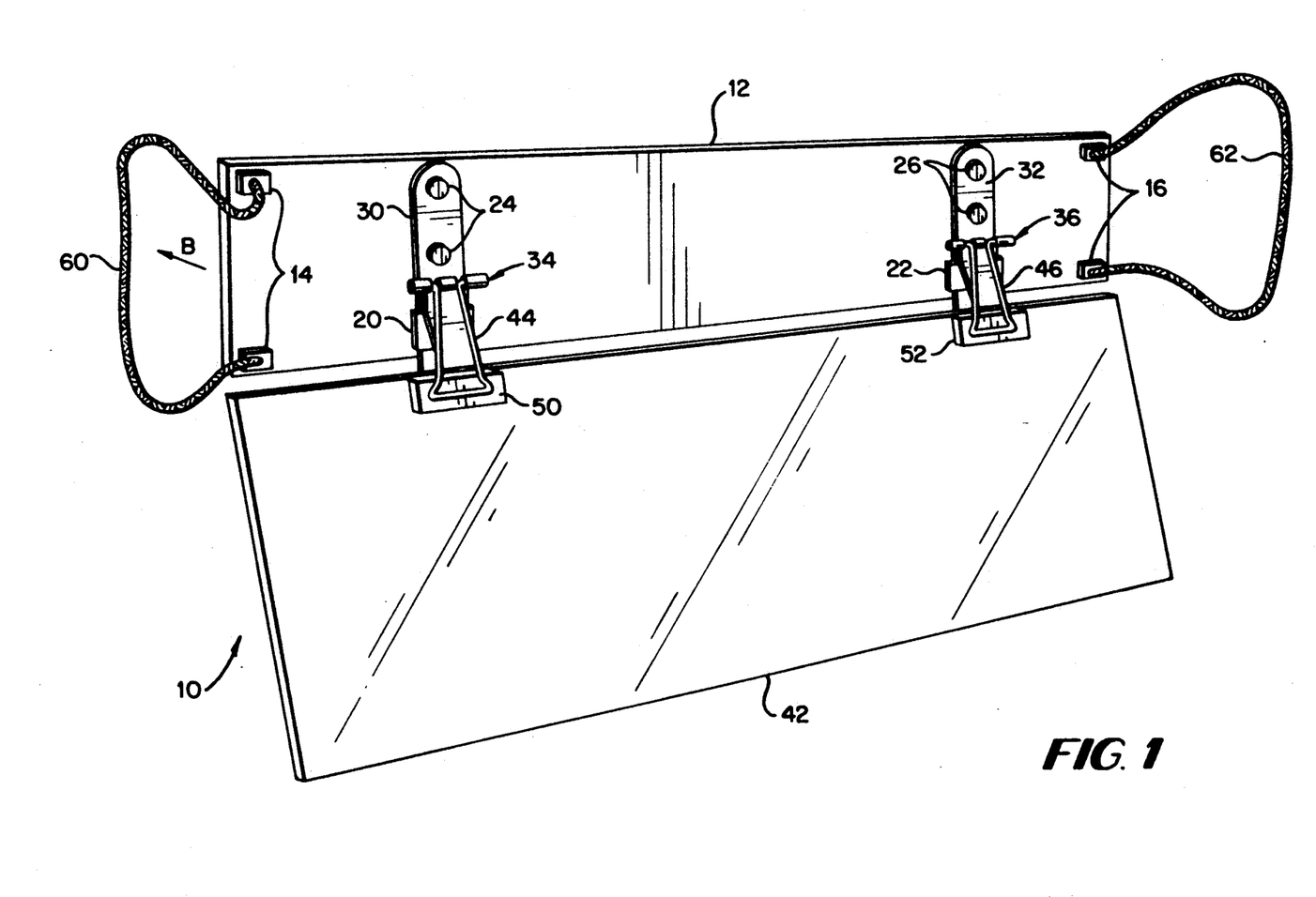
FIG. 1 is a perspective view of an embodiment of the invention with a backing having a rectangular cross section and with the glare shield in the down and operational position.
Figure 2:
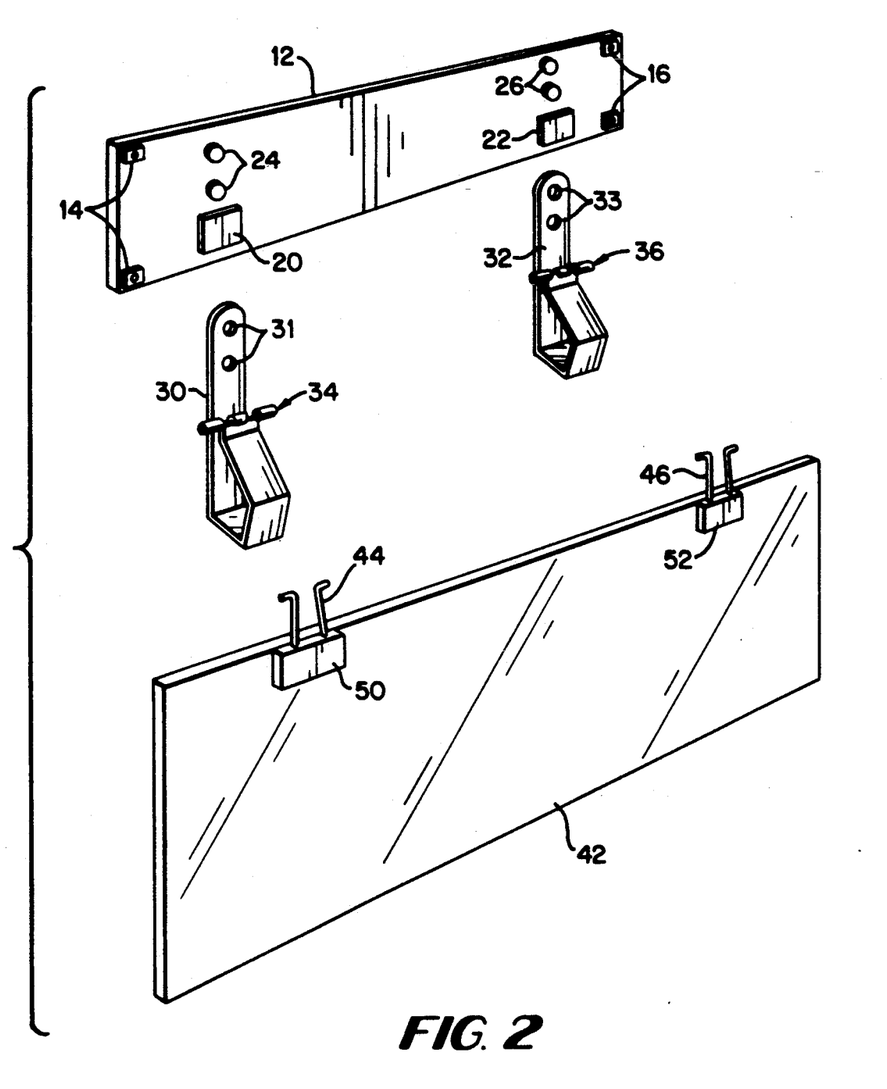
FIG. 2 is an exploded perspective view of the major components of the embodiment of FIG. 1.

FIGS. 1 and 2 shows the glare shield 42 comprising two clips 44 and 46 mounted onto the glare shield 42 by transparent mounting supports 50 and 52. Clips 44 and 46 are preferably made of metal or plastic and engage with loops 34 and 36 on the ends of the short sides of J-shaped band clamps 30 and 32. Band clamps 30 and 32 are preferably made of metal or plastic and the ends of the long side are passed through the passageway defined by backing 12 and brackets 20 and 22 and holes 31 and 33 are engaged with buttons 24 and 26 to secure clamps 30 and 32 to backing 12.

Figure 4:
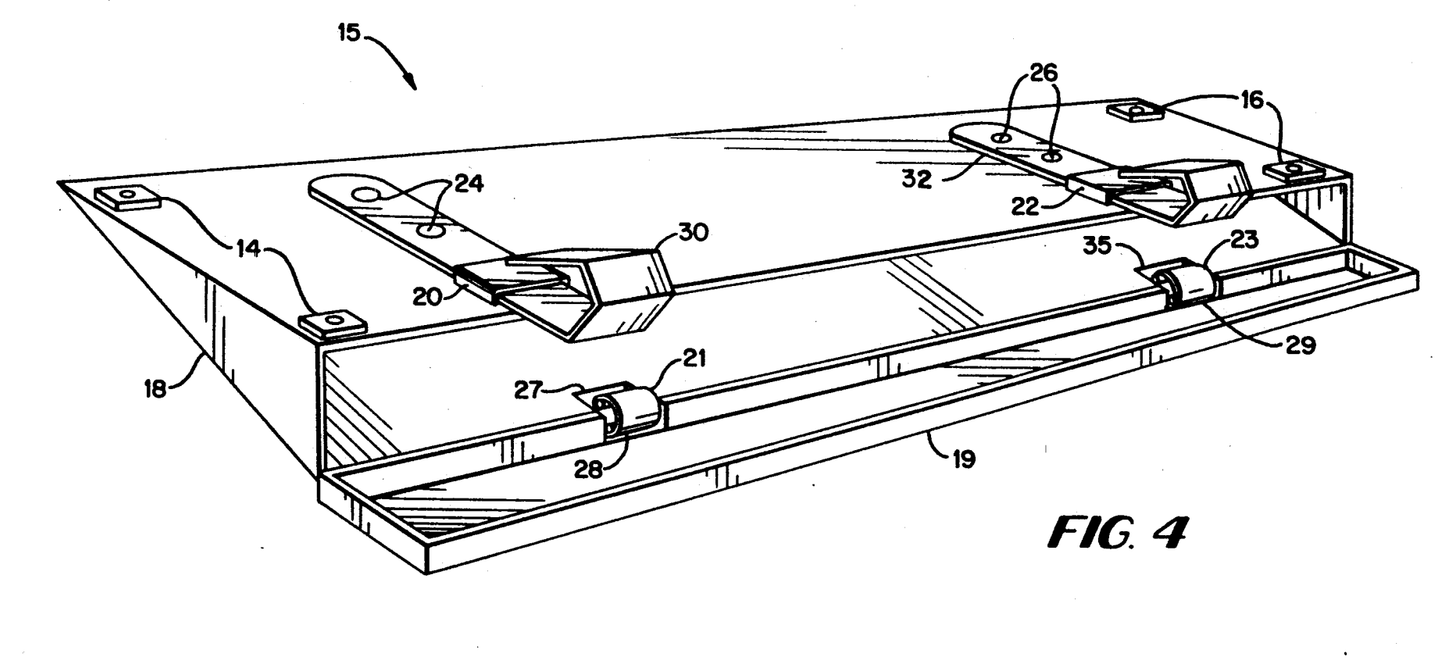
FIG. 4 is a perspective view of an embodiment with a backing having a triangular configuration, and no glare shield, utilized as a mini storage space.
Figure 14:
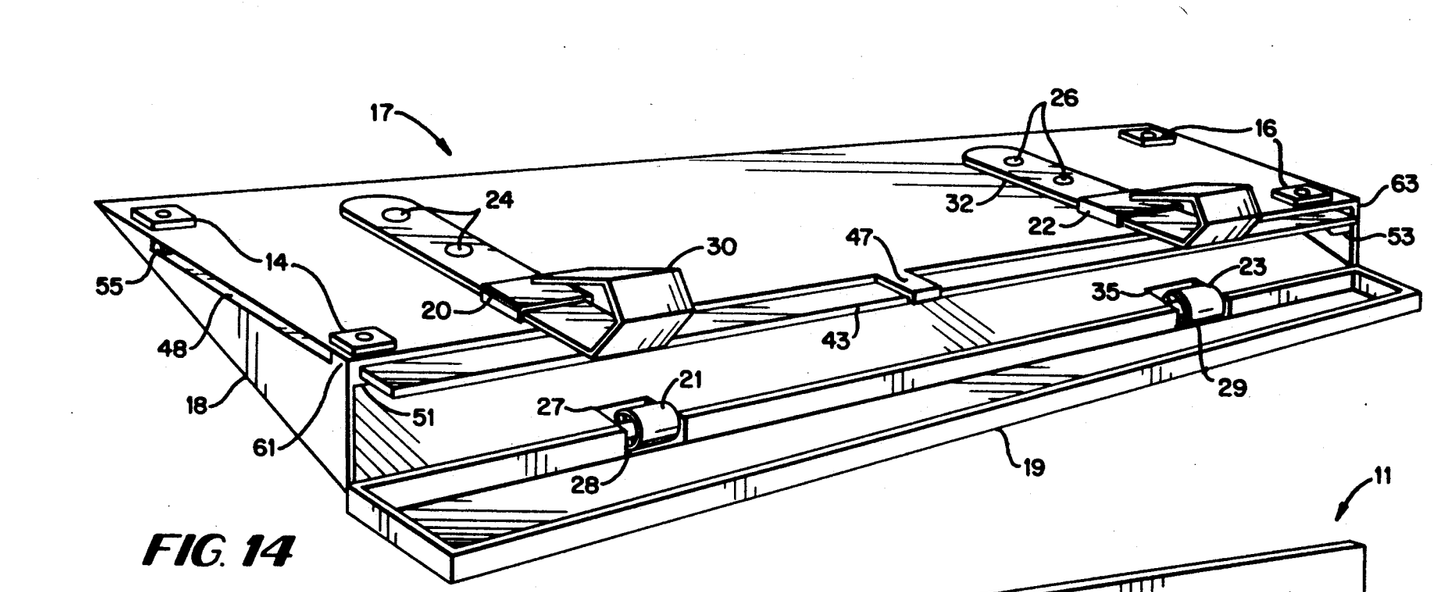
FIG. 14 is a perspective view of an alternative embodiment with a triangular cross section backing having a glare shield compartment which permits the shield to slide in and out of the compartment when desired by the user.

The ends of the short sides of the band clamps 30 and 32 (with clips 44 and 46) are preferably canted approximately halfway towards the long sides of the band clamps (as shown in FIGS. 2, 4 and 14), so that when the band clamps 30 and 32 are engaged with a visor 70, the long sides and the short sides of the band clamps 30 and 32 are forced to be approximately parallel (as shown in FIGS. 5, 6, 7, 15 and 16), thus compressing the ends of the short sides of the band clamps 30 and 32 against the visor 70, which increases the frictional forces retaining the device 10 on the visor 70.

Figures 8A, 8B:
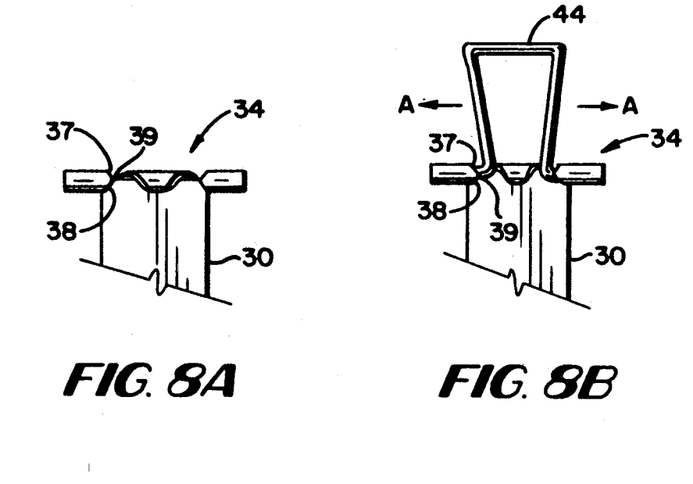
Figure 8C:
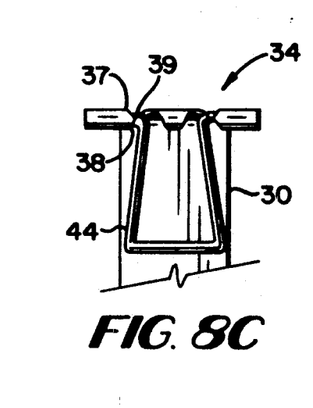

FIGS. 8A, 8B and 8C show the loop 34 formed in the end of the short side of band clamp 30 (clamp 32 being identical) comprising a tapered edge 37, ridge point 39, and an opposite tapered edge 38. In FIG. 8B, the ends of clip 44, which is preferably made of metal or plastic, are compressed to exert outward forces in directions A and engaged in tapered slot 37 to latch clip 44 and corresponding glare shield 42 (not shown) in the up and stored position. By manually pivoting clip 44 or corresponding glare shield 42 (not shown) in the down and operational position, spring-opened clip 44 ascends ridge point 39 and latches in tapered slot 38. Glare shield 42 will now be held in the down and operational position. This type of hinge is often used in binder clips for stationery. Of course, any other means for hingedly attaching the glare shield 42 to the backing 12 can be used and are considered equivalents, although means that bias the glare shield in either the down and operational position or in the up and stored position are preferred, as are means that otherwise prevent unintended movement of the glare shield 42, such as frictional hinges.

Figure 5:
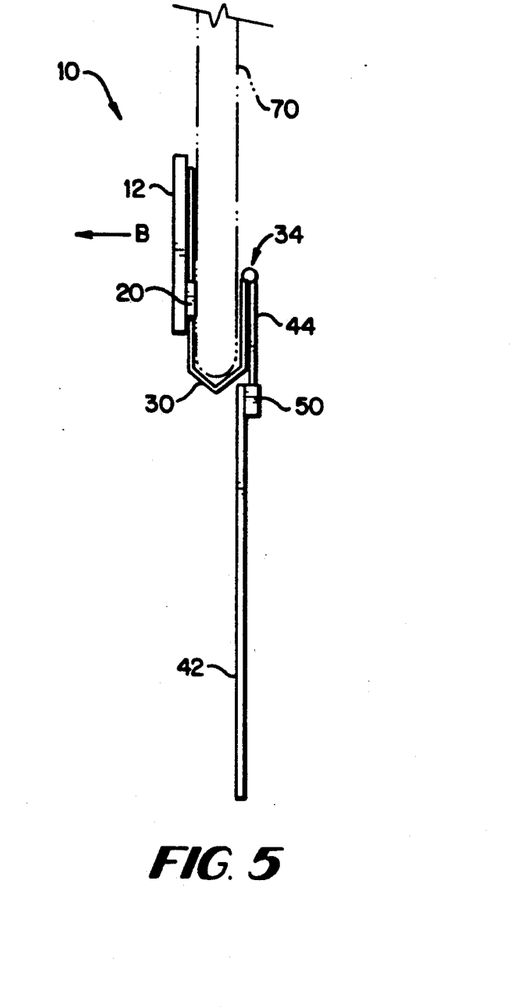
FIG. 5 is a side view of the embodiment of FIG. 1 with the glare shield in the down and operational position.
Figure 6:
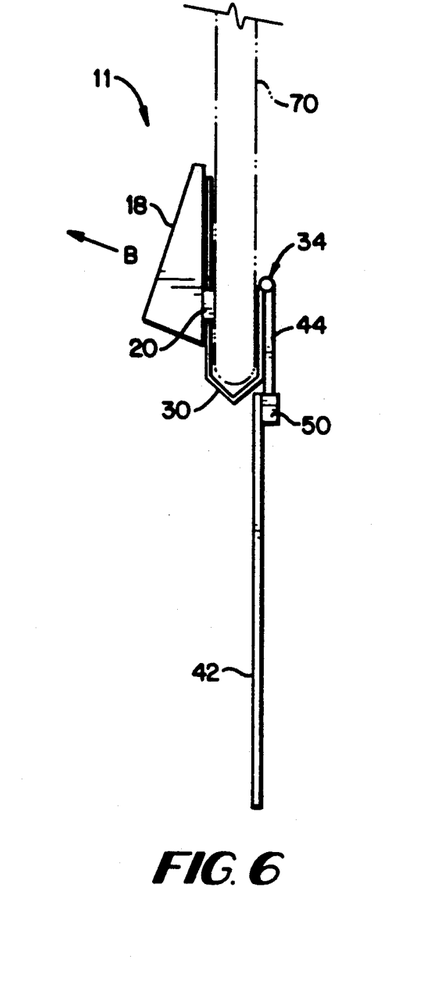
FIG. 6 is a side view of the embodiment of FIG. 3 with the glare shield in the down and operational position.
Figure 7:
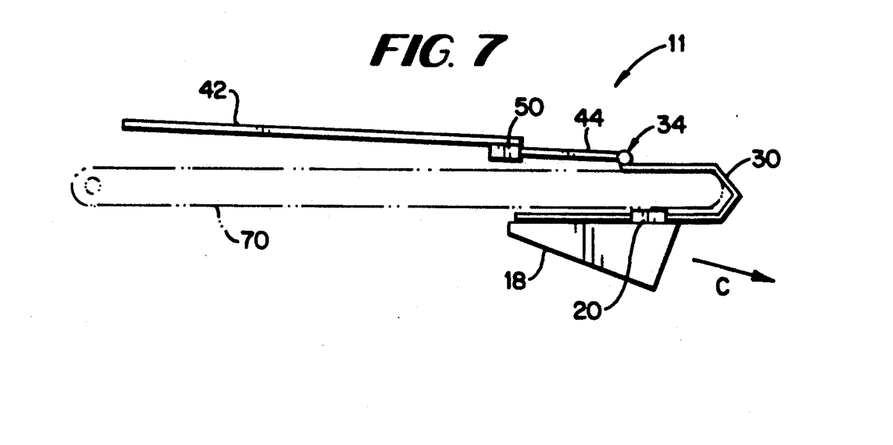
FIG. 7 is a side view of the embodiment of FIG. 3 in the up and stored position.

Band clamps 30 and 32 allow the device 10 to be mounted onto a typical sun visor 70, as shown in the side view of FIGS. 5, 6, and 7. Elastic cords (or straps with hook and loop fasteners, such as Velcro ®) 60 and 62 (shown in FIG. 1) can be wrapped around sun visor 70 at two locations to further secure the device 10 to the sun visor 70.

As can be seen from the above, this structure of hinge for the glare shield 42 and attachment means for the backing 12 allows the front surface of the backing to be substantially free of projections and substantially flat. Thus, advertisements, trademarks and other material can be displayed on the front surface of backing 12. This material will be displayed in direction B (out through the front windshield of the automobile) while the invention is in the down and operational position.

Figure 10:
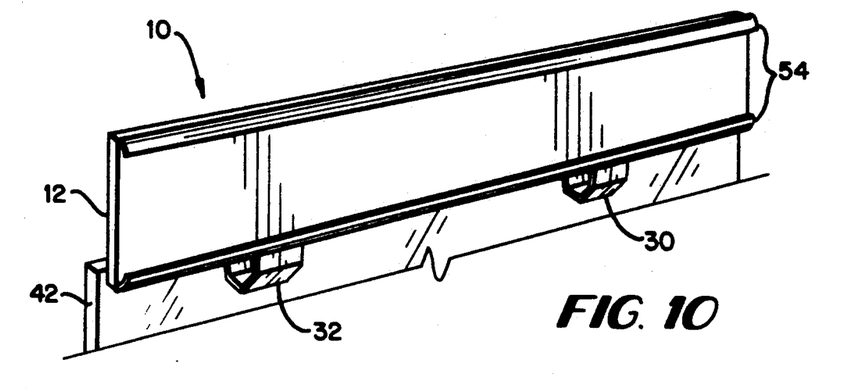
FIG. 10 is a perspective view of an embodiment having a rectangular cross section backing using grooved tracks as a means for removably retaining displays.
Figure 11:
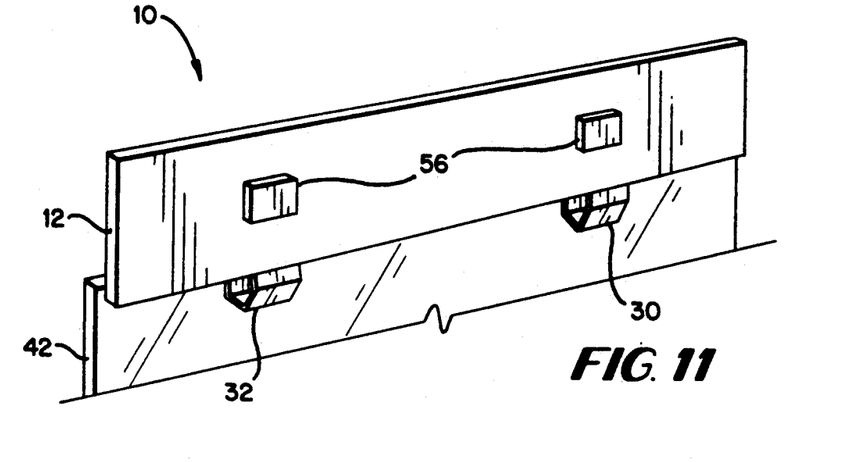
FIG. 11 is a perspective view of an embodiment having a rectangular cross section backing using magnets as a means for removably retaining displays.

FIG. 10 illustrates the device 10 with grooved tracks 54 as a means for releasably retaining displays in the invention. FIG. 11 illustrates the accessory 10 utilizing magnets 56 as a means of attaching displays with metallic characteristics onto the invention.

Figure 3:
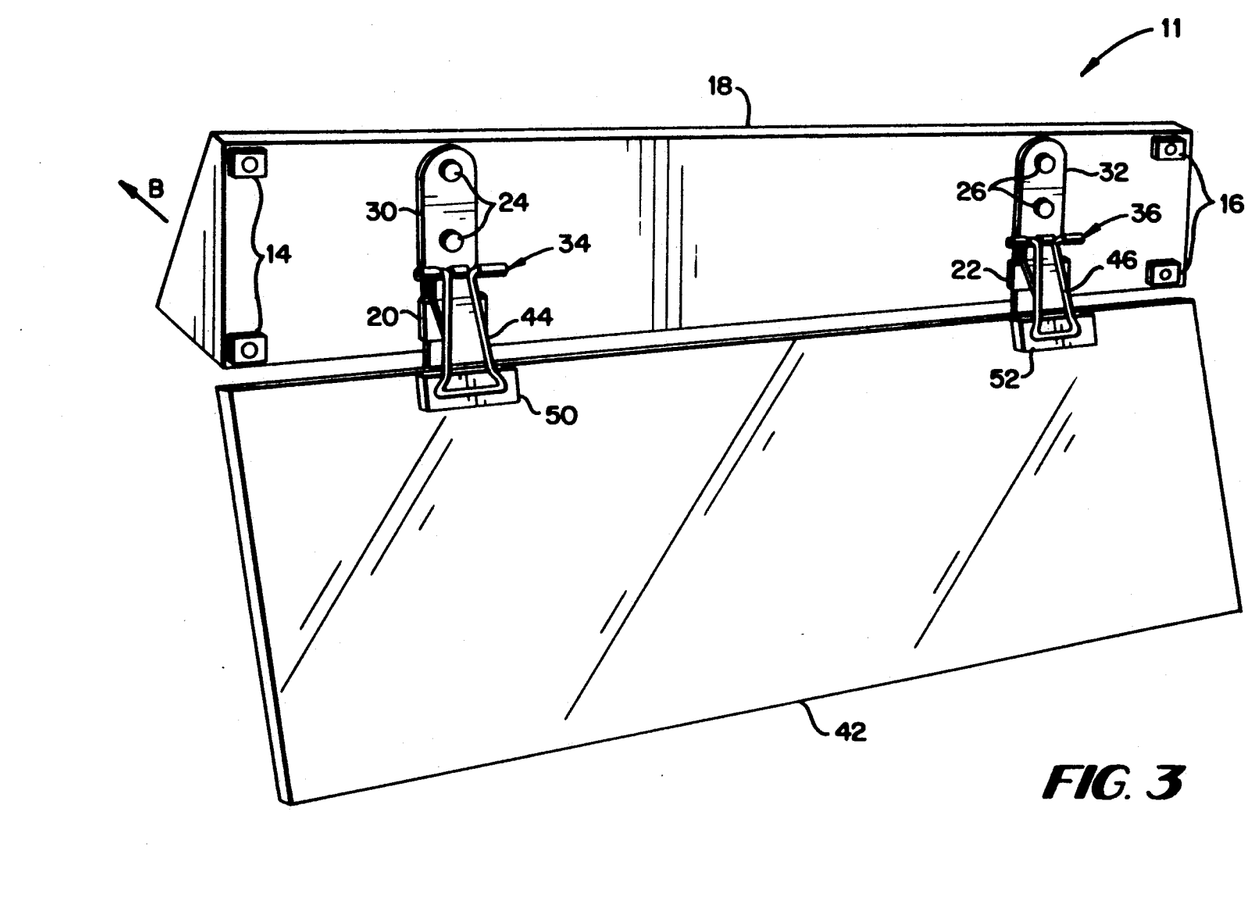
FIG. 3 is a perspective view of an embodiment of the invention having a backing with a triangular cross section with the glare shield in the down and operational position.
Figure 12:
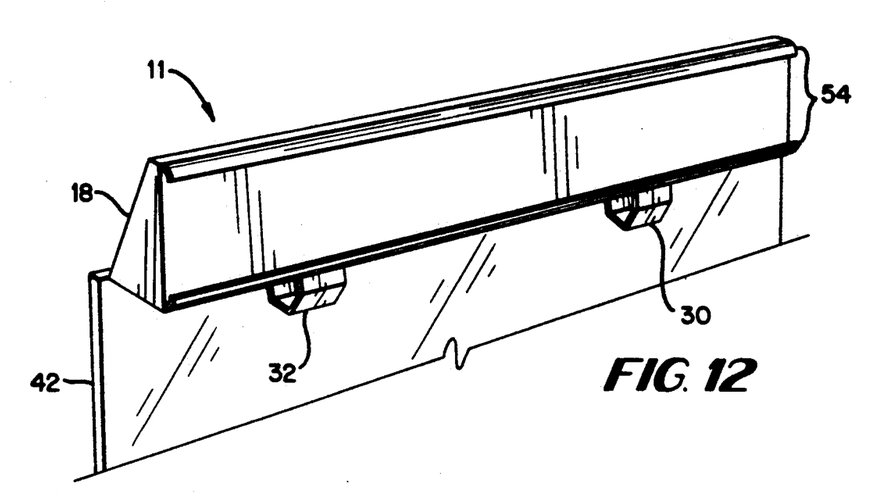
FIG. 12 is a perspective view of an embodiment having a triangular cross section backing using grooved tracks as a means for removably retaining displays.
Figure 13:
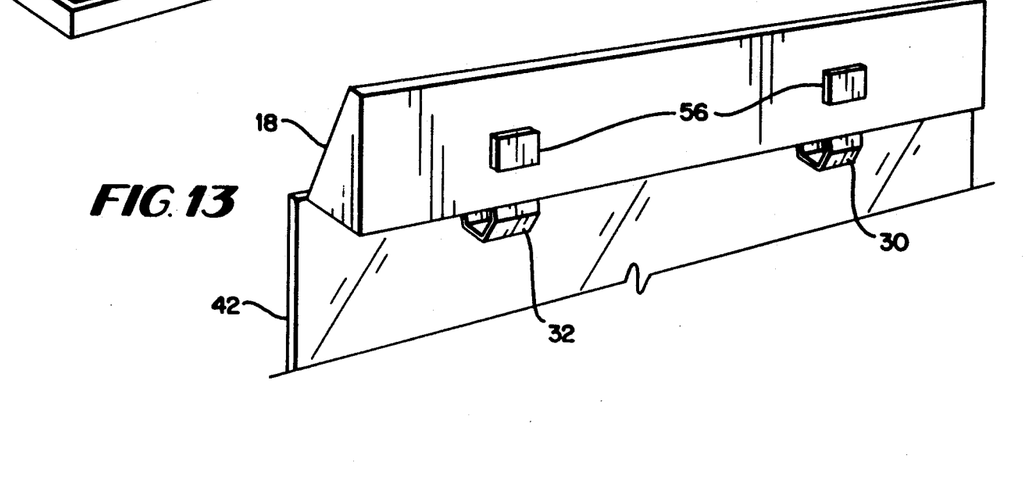
FIG. 13 is a perspective view of an embodiment having a triangular cross section backing using magnets as a means for removably retaining displays.

Referring to FIGS. 3, 6, 7, 12 and 13, shown is an alternative embodiment of the device 11 with a backing 18 having a triangular cross section. All components mentioned above for rectangular cross section backing 12 apply to triangular cross section backing 18. While the glare shield 42 is in the down and operational position, triangular cross section backing 18 can be used as a means to display advertisements, trademarks and other material on the front surface in direction B as shown in FIGS. 3 and 6. Further, as shown in FIG. 7, when the triangular cross section backing 18 is in the up and stored position, a smaller display space is created visible in direction C, or towards the interior of the automobile or vehicle. FIG. 12 illustrates the device 11 utilizing grooved tracks 54 as a means for releasably retaining displays. FIG. 13 illustrates the device 11 using magnets 56 as a means for releasably retaining displays. Of course, the same or other means for releasably retaining displays can also be used on the small display space at the base of the triangular cross section backing 18. This triangular cross section backing 18 can be constructed of plastic, rubber, sturdy foam, and the like.

Referring to FIG. 4, shown is another embodiment 15 without a glare shield. This embodiment comprises a triangular cross section backing 18, a hinged cover 19, two brackets 20 and 22, two pairs of buttons 24 and 26, two J-shaped metal or plastic band clamps 30 and 32, and two pairs of support mounts 14 and 16 to be used for the addition of elastic cords (or straps with hook and loop fasteners, such as Velcro ®) 60 and 62 (not shown). While the device 15 is in the up position on a typical sun visor, hinged cover 19 can be opened and the triangular structure can function as a mini storage space for items such as the automobile registration, the safety inspection form, and pencils. Hinged cover 19 will be latched in the opened and closed position by spring-closed metal bands 21 and 23 and hinged slots 27, 28, 29, and 35.

Figure 9A:
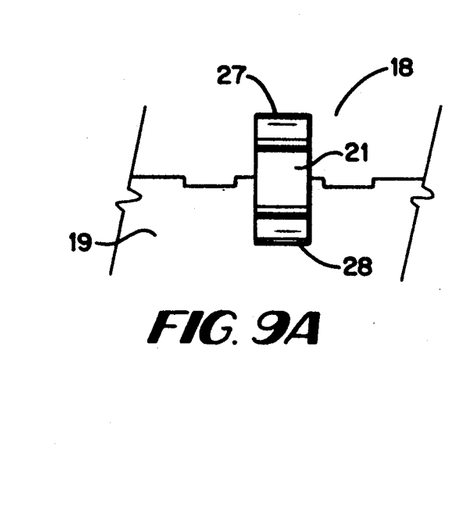
Figure 9B:
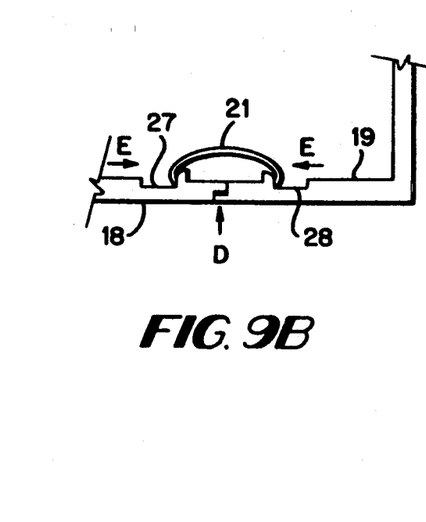
Figure 9C:
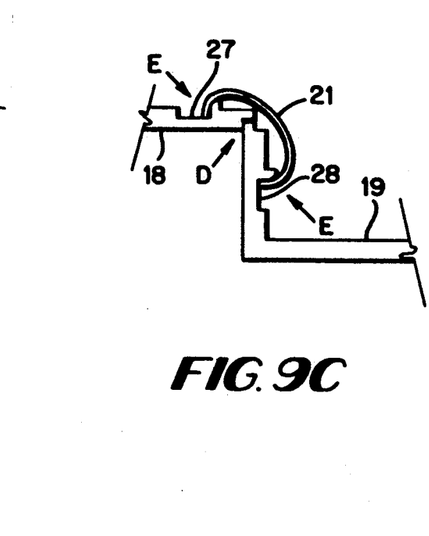

FIG. 9A shows a top plan view of the typical hinged cover assembly, which incorporates hinges similar to the hinges in a jewelry box. FIG. 9B shows a side elevational view which shows a partial view of the hinged cover assembly in the closed position. Spring-closed metal band 21 engages into recessed areas 27 and 28 to secure triangular cross section backing 18 to hinged cover 19 at pivotal point D with a closing force in directions E to keep hinged cover 19 flush with triangular cross section backing 18. FIG. 9C shows a side elevational view which shows a partial view of the hinged cover assembly in the opened position. Spring-closed metal band 21 engages into recessed areas 27 and 28 to secure triangular structure 18 to hinged cover 19 at pivotal point D with closing force in directions E to keep hinged cover 19 in the opened and latched position.

Referring initially to FIGS. 14, 15, 16, and 17, an accessory 17 according to another embodiment of this invention with a storable glare shield comprises a triangular structure 18, a tinted transparent shield 43, a glare shield latch 47, two brackets 20 and 22, two pairs of buttons 24 and 26, two J-shaped metal or plastic band clamps 30 and 32, and two pairs of support mounts 14 and 16 that are used to secure two elastic cords (or straps with hook and loop fasteners, such as Velcro®) 60 and 62 (not shown). All components mentioned above for the triangular mini storage configuration 15 apply to this configuration with the added capability of sliding glare shield 43 in and out of triangular structure 18.

Referring to FIG. 14, accessory 17 is provided with two glare shield tracks 51 and 53, two end stops 61 and 63, two side slots 48 and 49 (49 not shown), and also glare shield latch 47 securing glare shield 43 in the latched and stored position.

Figure 15:
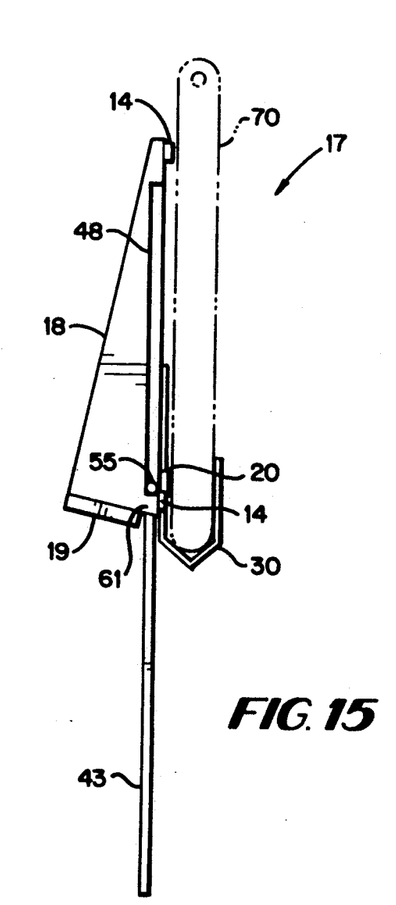
FIG. 15 is a side view of the embodiment of FIG. 14 with the glare shield slid out from the triangular compartment and in the down and operational position.

FIG. 15 shows a side view of accessory 17 in the down and operational position with glare shield 43 extending down from triangular structure 18. Glare shield 43 includes glare shield stops 55 and 57 (57 not shown) which engage with side shots 48 and 49 (49 not shown). In the fully extended position, glare shield stop 55 abuts against end stop 61 to retain glare shield 43 in triangular cross section backing 18.

Figure 16:
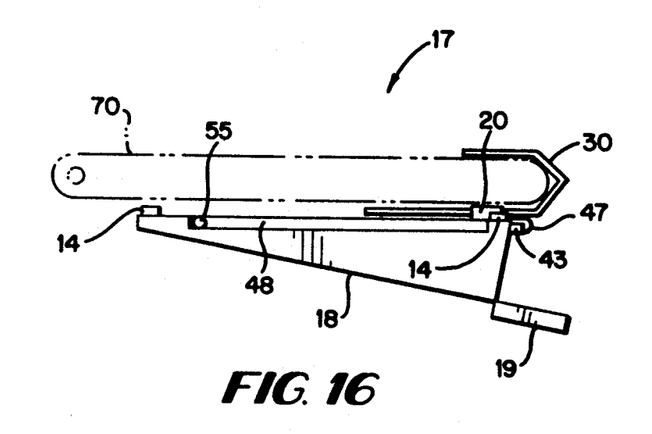
FIG. 16 is a side view of the embodiment of FIG. 14 in the raised position with the glare shield in the up and stored position in the triangular compartment and out of sight and with the cover for the mini storage space in the opened position.

FIG. 16 shows accessory 17 in the up and stored position with glare shield 43 retracted into triangular structure 18. Glare shield latch 47 secures glare shield 43 in the stored position. Hinged cover 19 is shown in the down and opened position. Glare shield stop 55 is also at the end of side slot 48.

Figure 17:
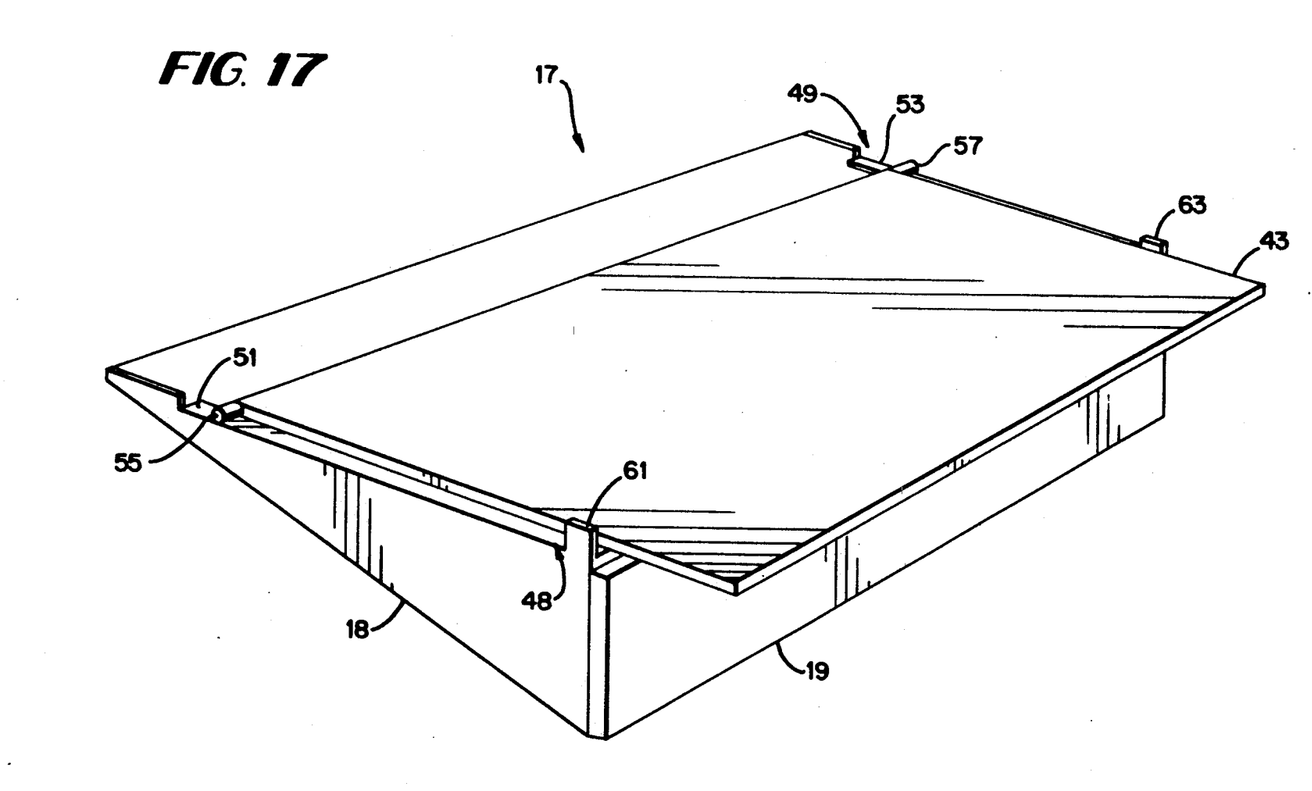
FIG. 17 is a perspective view of the embodiment of FIG. 14 with the rear surface of the backing removed for clarity depicting the interior of the glare shield compartment.

FIG. 17 illustrates accessory 17 with the rear surface of the backing 18 removed for clarity, showing glare shield tracks 51 and 53 and side slots 48 and 49, which guide glare shield stops 55 and 57 on glare shield 43 while it slides from the stored position to the operating position, or visa versa.

Figures 18, 19:
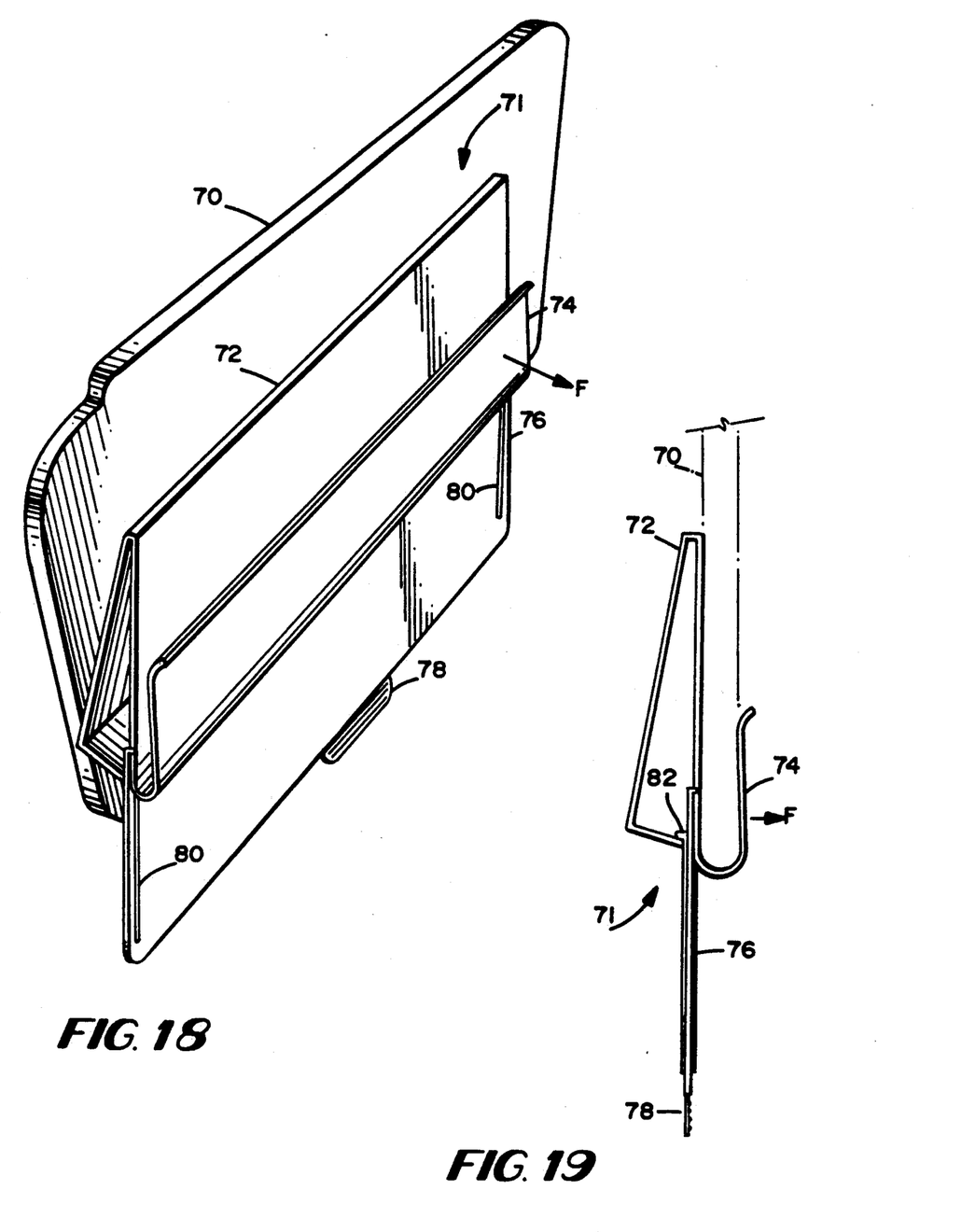
FIG. 18 is a perspective view of a preferred embodiment of the invention with an open ended triangular cross section backing and an integrally formed elongated clamp. The triangular cross section backing forms a glare shield compartment and a glare shield is slidably mounted on the backing to slide in and out of the compartment when desired by the user.
FIG. 19 is a side view of the embodiment of FIG. 18 with the glare shield extended from the triangular cross section backing and in the down and operational position.

Referring to FIGS. 18 and 19, shown is an accessory 71 according to a preferred embodiment of this invention with a storable glare shield, comprising an open ended triangular cross section backing 72, a tinted transparent glare shield 76 (with pull tab 78) slidably attached to the backing 72, and an elongated clamp 74, preferably integrally formed with the backing 72 from a single sheet of material. The backing 72 forms a storage compartment for the glare shield 76 when it is slid into the stored position. The long and short sides of the elongated clamp 74 are forced to be approximately parallel (FIG. 19) when the accessory 71 is mounted on a visor 70, thus compressing the short side of the elongated clamp 74 against the visor 70, which increases the friction retaining the device 71 on the visor 70. The elongated clamp 74 preferably has a rearward surface that is substantially flat and substantially free of projections that can be used as yet another means to display advertisements, trademarks and other material on the rearward surface in direction F, when the sun visor is down.

FIG. 18 shows two slotted tracks 80 on the glare shield 76 which slidably frictionally engage with the edges of triangular cross section backing 72. The friction between the triangular structure 72 and the tracks 80 on glare shield 76 will prevent the shield 76 from falling when the sun visor 70 is placed in the down and functional position. The user can manually slide the glare shield 76 in and out of the triangular cross section backing 72 by using the pull tab 78. FIG. 19 also shows a stop notch 82 to prevent the glare shield 76 from becoming detached from the triangular cross section backing 72.

It will be appreciated that the accessory according to the preferred embodiments of this invention is simple in design, functional in use, and inexpensive to manufacture.

This invention has been described above in connection with particular preferred embodiments and modifications and changes from the disclosed embodiments may be made without departing from the spirit and scope of the invention. Accordingly, no limitations are to be inferred or implied except as explicitly and specifically set forth in the appended claims.

Industrial Applicability

This invention is applicable to any sun visor for a vehicle and provides a new medium for advertising and display.

What is claimed is:

1. An accessory for a sun visor having a windshield side and a passenger side, comprising:
   a backing having a front surface with a lower edge and a rear surface with a lower edge;
     wherein said front surface is substantially flat and substantially free of projections;
   attachment means for attaching said backing to said windshield side of said sun visor mounted on said backing at a location other than said front surface, whereby substantially all of said front surfaces of said backing remains substantially free of projections; and
   a glare shield movably mounted on said backing to move between an up and stored position and a down and operational position;
   wherein said backing has a substantially triangular cross section defined by a front member defining said front surface, a rear member defining said rear surface, and a base member defining a base surface disposed between said lower edge of said front surface and a lower edge of said rear surface.

2. An accessory according to claim 1, wherein:
   said base surface is substantially flat and substantially free of projections.

3. An accessory according to claim 2, wherein said attachment means comprises an elongated clamp attachment to said rear member.

4. An accessory according to claim 3, wherein said elongated clamp has a clamp surface that is substantially flat and substantially free of projections spaced apart from, substantially parallel to, and facing in substantially the same direction as, said rear surface.

5. An accessory according to claim 4, wherein said base member, said front member, said rear member and said elongated clamp are integrally formed from a single sheet of material.

6. An accessory according to claim 5, wherein said glare shield is slidably mounted on said rear member.

7. An accessory according to claim 1, wherein said base member is hingedly attached to said front member.

8. An accessory according to claim 1, wherein said base member is hingedly attached to said rear member.

9. An accessory for a sun visor having a windshield side and a passenger side, comprising:
- a backing having a front surface with a lower edge and a rear surface with a lower edge;
    - wherein said front surface is substantially flat and substantially free of projections;
- attachment means for attaching said backing to said windshield side of said sun visor mounted on said backing at a location other than said front surface, whereby substantially all of said front surfaces of said backing remains substantially free of projections;
- a glare shield movably mounted on said backing to move between an up and stored position and a down and operational position;
- wherein said attachment means comprises J-shaped clips mounted on said rear surface;
- wherein said attachment means further comprises elastic members attached to said backing at a location other than said front surface adapted to attach said backing to said windshield side of said sun visor.

10. An accessory for a sun visor having a windshield side and a passenger side, comprising:
- a backing having a front surface with a lower edge and a rear surface with a lower edge;
    - wherein said front surface is substantially flat and substantially free of projections;
- attachment means for attaching said backing to said windshield side of said sun visor mounted on said backing at a location other than said front surface, whereby substantially all of said front surfaces of said backing remains substantially free of projections; and
- a glare shield movably mounted on said backing to move between an up and stored position and a down and operational position;
- wherein said attachment means comprises J-shaped clips mounted on said rear surface;
- wherein said attachment means further comprises straps having hook and loop fasteners attached to said backing at a location other than said front surface adapted to attach said backing to said windshield side of said sun visor.

11. An accessory for a sun visor having a windshield side and a passenger side, comprising:
- a backing having a substantially triangular cross section defined by a front member having a substantially flat front surface substantially free of projections, a rear member, and a base member having a substantially flat base surface substantially free of projections, said front member, said rear member and said base member defining a storage space, wherein said base member is hingedly attached to said front member, whereby said base member can be pivoted between an open position to allow access to said storage space and a closed position to close said storage space;
- attachment means for attaching said backing to said windshield side of said sun visor mounted on said backing at a location other than said front surface, whereby substantially all of said front surface remains substantially free of projections and substantially all of said base surface remains substantially free of projections.

12. An accessory according to claim 11, further comprising:
- a glare shield movably mounted on said backing to move between an up and stored position and a down and operational position.

13. An accessory according to claim 11, wherein:
- said glare shield is slidably mounted on said backing, whereby said glare shield slides inside said storage space in said up and stored position and slides out of said storage space into said down and operational position.

14. An accessory according to claim 11, further comprising latch means for latching said base member in said closed position.

15. An accessory according to claim 11, further comprising stop means for stopping said glare shield from sliding completely out of said storage space.

16. An accessory for a sun visor having a windshield side and a passenger side, comprising:
- a backing having a substantially triangular cross section, comprising:
    - a front member defining a front surface and having an upper edge and a lower edge;
    - a rear member defining a rear surface and having an upper edge and a lower edge, said upper edge of said rear member being attached to said upper edge of said front member; and
    - a base member defining a base surface disposed between said lower edge of said front surface and said lower edge of said rear surface;
- an elongated clamp member attached to said lower edge of said rear surface having a clamp surface spaced apart from, substantially parallel to, and facing substantially the same direction as, said rear surface, whereby said clamp member compresses said sun visor between said clamp member and said rear surface when said sun visor is inserted between said rear surface and said clamp member, whereby said accessory is attached to said sun visor;
- wherein said front surface is substantially flat and substantially free of projections;
- wherein said base surface is substantially flat and substantially free of projections;
- wherein said clamp surface is substantially flat and substantially free of projections; and
- a glare shield movably mounted on said backing to move between an up and stored position and a down and operational position.

17. An accessory according to claim 16, wherein said base member, said front member, said rear member and said clamp member are integrally formed from a single sheet of material.

18. An accessory according to claim 16, wherein said glare shield is slidably mounted on said rear member.

19. An accessory according to any one of claims 11 and 16, wherein said glare shield comprises a substantially rectangular, tinted, transparent material having rounded edges.

20. An accessory according to any one of claims 11 and 16, further comprising retaining means for removably retaining a message on said front surface.

21. An accessory according to claim 20, wherein said retaining means comprises at least one grooved track attached to an edge of said front surface.

22. An accessory according to claim 20, wherein said retaining means comprises a magnet mounted on said front surface.

23. An accessory according to any one of claims 2 or 21, further comprising retaining means for removably retaining a message on said base surface.

24. An accessory according to claim 23, wherein said retaining means comprises at least one grooved track attached to an edge of said base surface.

25. An accessory according to claim 23, wherein said retaining means comprises a magnet mounted on said base surface.

* * * * *